United States Patent Office 2,875,124

Patented Feb. 24, 1959

1

2,875,124

CEREAL RUST ERADICANT COMPOSITION COMPRISING A PHENYLHYDRAZONE DERIVATIVE AND METHOD OF USE

Van R. Gaertner and Dexter B. Sharp, Dayton, Ohio, assignors to Monsanto Chemical Company, St. Louis, Mo., a corporation of Delaware No Drawing. Application September 21, 1954
Serial No. 457,555

8 Claims. (Cl. 167—33)

The present invention relates to new and useful improvements in biological toxicants and more particularly provides new and valuable eradicants for cereal plant rusts, especially wheat rust, and methods of treating plants susceptible to attack by rusts in which methods said eradicants are used.

We have found that unusually effective fungicidal compositions are obtained when the active ingredient is a hydrazone of a carbonylic dihydropyran selected from the class consisting of hydrazones having the formula

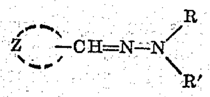

in which Z represents a divalent alkenyleneoxyalkylene chain completing the dihydropyran nucleus and having a total of from 5 to 11 carbon atoms, R is a hydrocarbon radical free of acetylenic and olefinic unsaturation and containing from 1 to 12 carbon atoms and R′ is selected from the class consisting of R and hydrogen; and a hydrazone having the formula

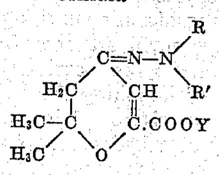

in which R and R′ are as herein defined and Y is an alkyl radical of from 1 to 12 carbon atoms.

The presently useful hydrazones are readily obtainable, in known manner, by the condensation of an appropriate dihydropyrancarboxaldehyde or carboxylated dihydropyrone with an appropriate hydrocarbon hydrazine.

Hydrazine compounds employed for the preparation of the presently useful condensates have the formula

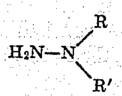

in which R and R′ are as above defined. One group of such hydrazines includes the alkyl- or the 1,1-dialkylhydrazines having from 1 to 12 carbon atoms in the alkyl radical, e. g., ethyl-, amyl- or n-octylhydrazine or 1,1-di-n-propyl-, 1,1-diisohexyl- or 1-amyl-1-butylhydrazine. Another group includes the cycloalkyl- or 1,1-dicycloalkylhydrazines, e. g., cyclopentyl-, 1,1-dicyclohexyl- or 1-cyclohexyl-1-(3-methylcyclopentyl)hydrazine. Still another group includes the aralkyl or the 1,1-bis(aralkyl)hydrazines such as 2-phenylethylhydrazine or 1,1-dibenzylhydrazine. A very useful group includes hydrazines having an aryl or alkaryl radical attached to one nitrogen atom and either hydrogen or a hydrocarbon radical free of non-benzenoid unsaturation attached to the same nitrogen atom, e. g., phenylhydrazine, p-tolylhydrazine, 2,4-dimethylphenylhydrazine or 2-ethylphenylhydrazine and the 1-alkyl, aryl, aralkyl, alkaryl, or cycloalkyl derivatives thereof such as 1-methyl-1-phenylhydrazine, 1-isoamyl-1-phenylhydrazine, 1-cyclohexyl-1-o-tolylhydrazine, 1-benzyl-1-phenylhydrazine, 1,1-diphenylhydrazine, etc. In the useful hydrazines, there may be only one hydrocarbon radical attached to one of the nitrogen atoms or there may be two of the same hydrocarbon radicals or two dissimilar hydrocarbon radicals attached to the one nitrogen atom. Because of the easy availability of phenylhydrazine, the condensation products of this particular hydrazine derivative and the carbonylic dihydropyrans and dihydropyrones are advantageously used in the preparation of the present fungicidal compositions.

The dihydropyrancarboxaldehydes used in preparing the presently employed hydrazones have the formula

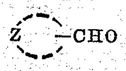

in which Z represents a divalent alkenyleneoxyalkylene chain completing the dihydropyran nucleus and having a total of from 5 to 11 carbon atoms. As examples of aldehydes having the above formula and useful for the preparation of present wheat-rust eradicant hydrazones may be mentioned 3,4-dihydro-2H-pyran-2-carboxaldehyde which is generally known as acrolein dimer; 5,6-dihydro-2,6-dimethyl-2H-pyran-3-carboxaldehyde, 3,4-dihydro-2,5-dimethyl-2H-pyran-2-carboxaldehyde which is the dimer of methacylaldehyde; 3,4-dihydro-2-amyl-2H-pyran-2-carboxaldehyde; 5,6-dihydro-2H-pyran-3-carboxaldehyde; 3,4-dihydro-3,4-dimethyl-2H-pyran-2-carboxaldehyde; 3,4 - dihydro - 2H - pyran-3-carboxaldehyde, etc.

The carboxylated dihydropyrones used for preparing the rust-inhibiting hydrazones are the alkyl esters of 3,4-dihydro-2,2-dimethyl-4-oxo-2H - pyran - 6 - carboxylic acid, e. g., methyl, ethyl, n-butyl, tert-amyl, 2-ethylhexyl, n-decyl or tert-dodecyl 3,4-dihydro-2,2-dimethyl-4-oxo-2H-pyran-6-carboxylates. They are obtained by reaction of mesityl oxide with an appropriate alkyl oxalate. The butyl ester is commonly known as indalone.

Cereal rust eradicants comprising the present hydrazones as the essential effective ingredients function as plant chemotherapeutants against the various leaf and stem rusts of wheat, barley, rye, and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance. In prior art, much effort has been expended in the past in breeding rust-resistant strains of these cereals; but as new strains of, e. g., wheat, are developed, new races of the above classes of rusts appear and proceed to attack the new, presumably rust-resistant strains of wheat. The history of breeding for rust-resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately, most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance.

Rust eradicant compositions may be prepared by mixing the present hydrazones with dusting materials such as talc, clay, lime, bentonite, pumice, fuller's earth, etc. The majority of the hydrazones will be found to be water-insoluble. These may be dissolved in organic solvents therefor and the resulting solutions used as fungicidal or fungi-prevening sprays. More expediently, a small amount of a concentrated solution of the hydrazone compound in an organic solvent, e. g., cyclohexanone, may be added to water in the presence of an emulsifying agent to form an emulsion, and the oil-in-water emulsion thus obtained is employed as a spray. Suspensions or dispersions of the hydrazone compounds in a non-solvent such as water, or aqueous solutions of the water-soluble compounds, are advantageously employed in the treatment of the plant foliage.

The present invention is further illustrated, but not limited, by the following examples:

*Example 1*

The therapeutic effect of the phenylhydrazone of 3,4-dihydro-2H-pyran-2-carboxaldehyde against wheat rust was determined as follows:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The 3,4-dihydro-2H-pyran-2-carboxaldehyde phenylhydrazone (100 mg.) was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the hydrazone. For the instant test the 1% emulsion was further diluted with water to give a concentration of 0.5% by weight of the test compound.

Spraying of the plants with the emulsion was effected by means of an atomizer, 5 ml. of the emulsion being used per pot of 5 plants. The sprayed plants were then returned to the greenhouse and held there for a week. Observation of the plants at the end of that time disclosed extensive suppression of rust in the case of the inoculated and sprayed plants, and no evidence of any phytotoxic effect of the spray. Similarly inoculated, but unsprayed plants, which had been maintained in the incubator and greenhouse for the same length of time were found to be badly affected by the rust.

*Example 2*

When the phenylhydrazone of indalone, i. e., of butyl 3,4 - dihydro - 2,2 - dimethyl - 4 - oxo - 2H - pyran - 6-carboxylate, was submitted to the test procedure described in Example 1, marked inhibition of rust growth was noted at the 0.5% concentration at which concentration there was no evidence of phytotoxicity.

What we claim is:

1. A wheat rust eradicant comprising water, an emulsifying agent, and a hydrazone of a carbonylic dihydropyran selected from the class consisting of hydrazones having the formula

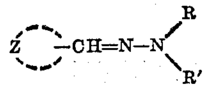

in which Z represents the dihydropyran radical formed by ring-closure of an alkenyleneoxyalkylene chain having a total of from 5 to 11 carbon atoms, R is a hydrocarbon radical free of acetylenic and olefinic unsaturation and containing from 1 to 12 carbon atoms and R' is selected from the class consisting of R and hydrogen; and a hydrazone having the formula

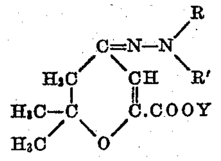

in which R and R' are as herein defined and Y is an alkyl radical of from 1 to 12 carbon atoms.

2. A wheat rust eradicant comprising water, an emulsifying agent, and the phenylhydrazone of a dihydropyrancarboxaldehyde having the formula

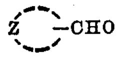

in which Z represents the dihydropyran radical formed by ring-closure of an alkenyleneoxyalkylene chain having a total of from 5 to 11 carbon atoms.

3. A wheat rust eradicant comprising water, an emulsifying agent, and a phenylhydrazone of an alkyl 3,4-dihydro - 2,2 - dimethyl - 4 - oxo - 2H - pyran - 6 - carboxylate having from 1 to 12 carbon atoms in the alkyl radical.

4. A wheat rust eradicant comprising water, an emulsifying agent, and a phenylhydrazone of a 3,4-dihydro-2H-pyran-2-carboxaldehyde.

5. A wheat rust eradicant comprising water, an emulsifying agent, and a phenylhydrazone of butyl 3,4-dihydro-2,2-dimethyl-4-oxo-2H-pyran-6-carboxylate.

6. The method of inhibiting the development of rust on wheat which comprises applying to the wheat a rust inhibiting quantity of a hydrazone of a carbonylic dihydropyran selected from the class consisting of hydrazones having the formula

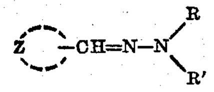

in which Z represents the dihydropyran radical formed by ring-closure of an alkenyleneoxyalkylene chain having a total of from 5 to 11 carbon atoms, R is a hydrocarbon radical free of acetylenic and olefinic unsaturation and containing from 1 to 12 carbon atoms and R' is selected from the class consisting of R and hydrogen; and a hydrazone having the formula

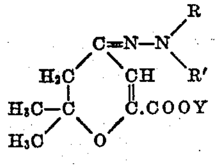

in which R and R' are as herein defined and Y is an alkyl radical of from 1 to 12 carbon atoms.

7. The method of inhibiting the development of rust on wheat which comprises applying to the wheat a rust inhibiting quantity of the phenylhydrazone of 3,4-dihydro-2H-pyran-2-carboxaldehyde.

8. The method of inhibiting the development of rust on wheat which comprises applying to the wheat a rust inhibiting quantity of the phenylhydrazone of butyl 3,4-dihydro-2,2-dimethyl-4-oxo-2H-pyran-6-carboxylate.

References Cited in the file of this patent

UNITED STATES PATENTS

| | | |
|---|---|---|
| 2,054,062 | Bonrath et al. | Sept. 15, 1936 |
| 2,776,300 | Jenkins | Aug. 31, 1951 |

FOREIGN PATENTS

| | | |
|---|---|---|
| 107,771 | Australia | July 6, 1939 |

OTHER REFERENCES

Horsfall: Fungicides and Their Action, vol. 2, 1945, p. 132.

Frear: A Catalogue of Insect. and Fung., vol. 1, p. 144, 1947, and vol. 2, p. 43, 1948.

McNew: Phytopathology, vol. 39 (1949), pp. 721–751.

UNITED STATES PATENT OFFICE

CERTIFICATE OF CORRECTION

February 24, 1959

Patent No. 2,875,124

Van R. Gaertner et al.

It is hereby certified that error appears in the printed specification of the above numbered patent requiring correction and that the said Letters Patent should read as corrected below.

Column 2, line 33, for "methacylaldehyde" read -- methacrylaldehyde --.

Signed and sealed this 11th day of April 1961.

(SEAL)

Attest:

ERNEST W. SWIDER

Attesting Officer

ARTHUR W. CROCKER

Acting Commissioner of Patents